United States Patent [19]

Gottlieb et al.

[11] Patent Number: 4,886,346

[45] Date of Patent: Dec. 12, 1989

[54] METHOD AND APPARATUS FOR IMPROVING THE ANGULAR APERTURE OF AN AODLF

[75] Inventors: Milton Gottlieb, Churchill; Nathan T. Melamed, Pittsburgh, both of Pa.

[73] Assignee: Westinghouse Electric Corp., Pittsburgh, Pa.

[21] Appl. No.: 156,043

[22] Filed: Feb. 16, 1988

[51] Int. Cl.$^4$ .............................................. G02F 1/11
[52] U.S. Cl. ................................................... 350/358
[58] Field of Search .................... 350/358, 353, 354

[56] References Cited

U.S. PATENT DOCUMENTS

| | | | |
|---|---|---|---|
| 3,729,250 | 4/1973 | Kustere et al. | 350/358 |
| 3,729,251 | 4/1973 | Hearn | 350/358 X |
| 3,759,603 | 9/1973 | Eschler | 350/358 |
| 3,928,814 | 12/1975 | Feichtner | 350/358 |
| 4,040,722 | 8/1977 | Nielson | 350/358 |
| 4,110,016 | 8/1978 | Berg et al. | 350/358 |
| 4,206,347 | 6/1980 | Avicola | 350/358 X |
| 4,602,852 | 7/1986 | Moroz | 350/358 |
| 4,639,092 | 1/1987 | Gottlieb | 350/358 X |
| 4,653,869 | 3/1987 | Gottlieb | 350/358 X |

FOREIGN PATENT DOCUMENTS

| | | | |
|---|---|---|---|
| 0079411 | 6/1980 | Japan | 350/358 |
| 0164718 | 10/1982 | Japan | 350/358 |

OTHER PUBLICATIONS

I. C. Chang, "Acousto-Optic Devices and Applications," IEEE Trans. on Sonics and Ultrasonics, vol. SU-23, No. 1, pp. 2-21, Jan. 1976.

Gogglieb et al., *Electro Optic and Acoustic Optic Scanning and Deflection*, Marcel, Dekker, 1985, at, for example p. 110, Equations 6.24 and 6.25.

*Primary Examiner*—Eugene R. Laroche
*Assistant Examiner*—Nathan W. McCutcheon

[57] ABSTRACT

A method and apparatus for increasing the angular aperture of an acousto-optic dispersive light filter in which acoustic frequencies of differing frequencies are launched into a crystal at differing angles to each other. Input light phase matches with corresponding ones of the acoustic frequencies so that the angular aperture is enlarged.

3 Claims, 2 Drawing Sheets

METHOD AND APPARATUS FOR IMPROVING THE ANGULAR APERTURE OF AN AODLF

BACKGROUND OF THE INVENTION

Field of the Invention

An acousto-optic dispersive light filter (hereinafter "AODLF") is a new acousto-optic spectroscopic device that exploits the optical birefringence properties of certain unique acousto-optical crystals, such as thallium arsenic selenide ($Tl_3AsSe_3$) (hereinafter "TAS"). The structure and operation of an AODLF is disclosed in U.S. Pat. Nos. 4,639,092 and 4,653,869, both assigned to the assignee of the subject application, and hereby incorporated by reference.

An AODLF functions similar to a conventional diffraction grating. But, in an AODLF the diffraction grating or spacing is electronically determined by the frequency of the acoustic signal applied to the AODLF. A crucial difference between a conventional diffraction grating and an AODLF is that the AODLF operates as a birefringent device, in which the polarization of the diffracted light is rotated 90° with respect to that of the incident light, and the refractive indices are different in the acousto-optical crystal for the incident light and the diffracted light. The well-known equations which relate the angle of incidence ($\theta_i$) and the angle of diffraction ($\theta_d$) to the optical wavelength of the incident light and the acoustic frequency applied to the AODLF are:

$$\sin \theta_i = \frac{1}{2n_i} \left[ \frac{\lambda f}{v} 1 + \left( \frac{v}{\lambda f} \right)^2 (n_i^2 - n_d^2) \right] \quad (1)$$

$$\sin \theta_d = \frac{1}{2n_d} \left[ \frac{\lambda f}{v} 1 - \left( \frac{v}{\lambda f} \right)^2 (n_i^2 - n_d^2) \right] \quad (2)$$

wherein
$\theta_i$ = the angle of incidence
$\theta_d$ = the angle of diffraction
$n_i$ = refractive index for the incident light
$n_d$ = the index for the diffracted light
$\lambda$ = wavelength of incident light
f = the acoustic frequency
v = the acoustic velocity within the material For TAS, $n_i$ is 3.339, $n_d$ is 3.152, $\lambda$ is preferably in the range of 1.3 to 17 microns and v is $10^5$ cm/sec. Operating an AODLF with incident light having wavelengths outside of this preferred range results in reduced efficiency since the AODLF material absorbs the light. The angles $\theta_i$ and $\theta_d$ are measured with respect to the acoustic wave front shown in FIG. 2.

FIG. 1 is a plot of equations of 1 and 2 as a function of the incident wavelength for an AODLF operating with an acoustic frequency of 231 MHz. The AODLF is operated at the minimum value for the incident angle $\theta_i$ as shown in FIG. 1. Operation of the AODLF at or near this minimum value of $\theta_i$ ensures that variations of the incident wavelength will have practically no affect on $\theta_i$. The acoustic frequency and the wavelength of the incident light are related by the following equation.

$$f = (v/\lambda) \sqrt{n_i^2 - n_d^2} \quad (3)$$

An important characteristic of any AODLF is the angle of incidence through which light may be applied to the AODLF, without degrading the resolution of the AODLF. This is known as the angular aperture of an AODLF. A large angular aperture or acceptance angle is desirable since this results in an increased light gathering power, and therefore increased sensitivity to weak light signals.

The maximum aperture of an AODLF is determined by the allowable phase mismatch, between the incident optical wave and the acoustic waves, beyond which the diffraction efficiency of the AODLF drops to one-half the value for exact phase matching (i.e., exact Bragg angle matching as given by equations 1 and 2). The allowable angular aperture of an AODLF is expressed as follows.

$$\Delta \theta = n_i \frac{v}{fL} \quad (4)$$

In equation 4, L is the interaction length between the incident light and the acoustic waves. Typically, L is the length of the acoustic transducer and the remaining terms of equation 4 have the same meaning as in equations 1 and 2.

As seen from equation 4, angular aperture is directly proportional to the refractive index $n_i$ and the acoustic velocity v. These quantities, however, are fixed for a given material. The angular aperture is also inversely proportional to the acoustic frequency f, and the transducer length L. The acoustic frequency f, is chosen so as to operate the AODLF in the region of minimum slope for $\theta_i$ as shown in FIG. 1.

From equation 4, the angular aperture can be made large by making the acoustic transducer length L small. However, it is desirable to have L large, because the diffraction efficiency of the AODLF and the drive power for the AODLF are related to L. Diffraction efficiency is a well known quantity and is discussed in I.C. CHANG, "Acousto-Optic Devices and Applications," IEEE Trans. on Sonics and Ultrasonics, Vol. SU-23 No. 1, pp. 2-21, Jan. 1976, and in Gottlieb et al., *Electro Optic and Accoustic Optic Scanning and Deflection*, Marcel, Dekker, 1985, at, for example, page 110, Equations 6.24 and 6.25. As the length L increases, the diffraction efficiency improves, for a given drive power density. Therefore, it is undesirable to make L small, because the power drive requirements therefor are great. In short, the smaller the length L, an greater the needed power density. As a result, with small transducer lengths the transducer tends to overheat. For example, if 5 watts are needed for an AODLF, applying this power to a large transducer provides a low power density. But, when applying it to a small transducer the power density may be too high for the transducer. Therefore, making L small limits the amount of power that can be applied to the transducer. As a result, the angular aperture of an AODLF cannot be greatly improved by varying the length of the transducer L.

SUMMARY OF THE INVENTION

It is an object of the present invention to provide a method and apparatus for improving the angular aperture of an AODLF. It is another object of the present invention to provide a method and apparatus for improving the angular aperture of an AODLF without degrading the resolution of the AODLF.

To achieve the above and other objects of the present invention, an acousto-optic dispersive light filter according to the present invention comprises an optically birefringement crystal having an input face with an optic axis, an acoustic input face and an output face, an acoustic means operatively connecting to the acoustic input face, for launching a plurality of acoustic waves of differing frequencies into the crystal at respective angles to each other, so that light beams incident to the optical input face at respective angles with respect to the optic axis are diffracted to an output beam exiting the output face in accordance with corresponding ones of the acoustic frequencies.

To achieve the above in other objects the present invention provides a method of increasing the angular aperture of an acousto-optic dispersive light filter comprising an optically birefringent crystal having an optical input face with an optic axis, the method comprising the steps of launching a plurality of acoustic waves of differing frequencies into the crystal at respective angles to each other so that light beams incident to the optic face at angles with respect to optic axis are each diffracted to an output beam exiting the output face in accordance with corresponding ones of the acoustic frequencies, and applying light to the optical face at an angle of incident being within a predetermined angular distance from the optic axis.

DESCRIPTION OF THE PREFERRED EMBODIMENTS

Figure 1:
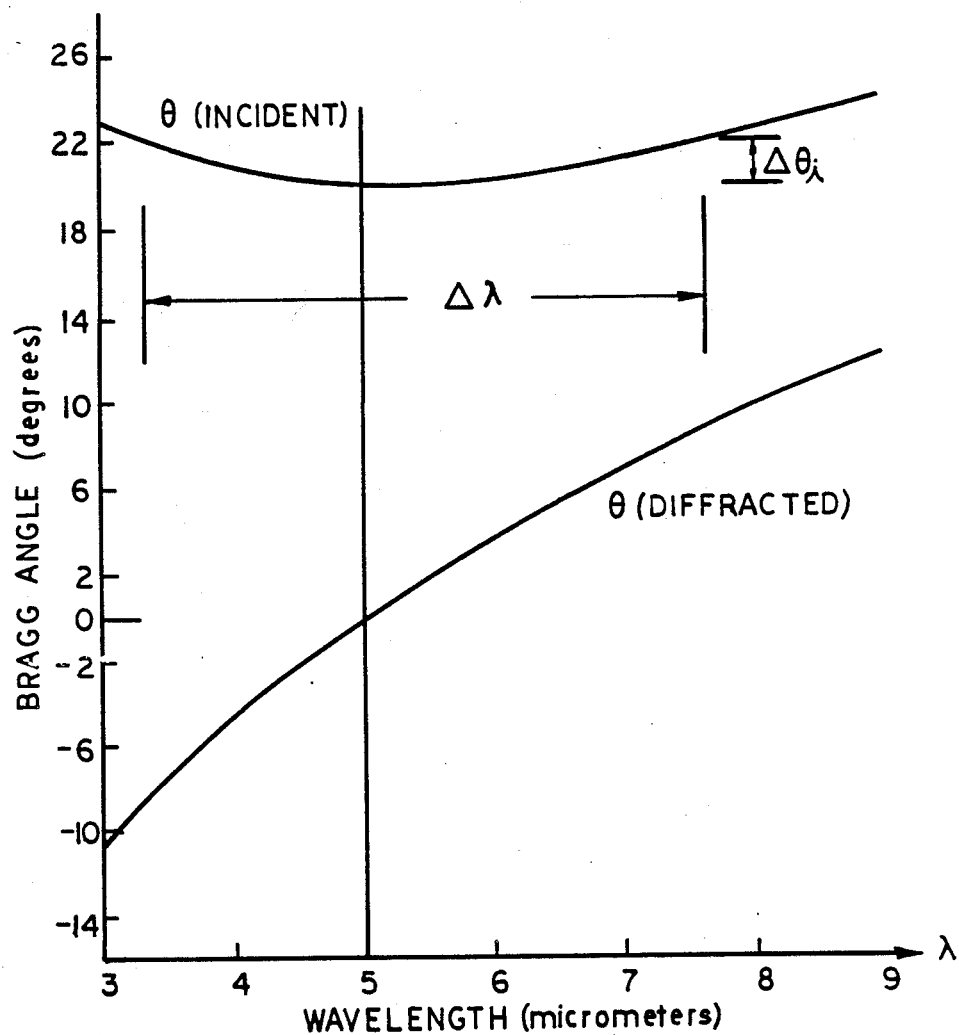
FIG. 1 is a graph illustrating the wavelength dependence of anisotropic Bragg angles for a thallium arsenic selenide crystal AODLF operating at a frequency of 231 MHz and illustrates the theory of acousto-optic phase matching.
Figure 3:
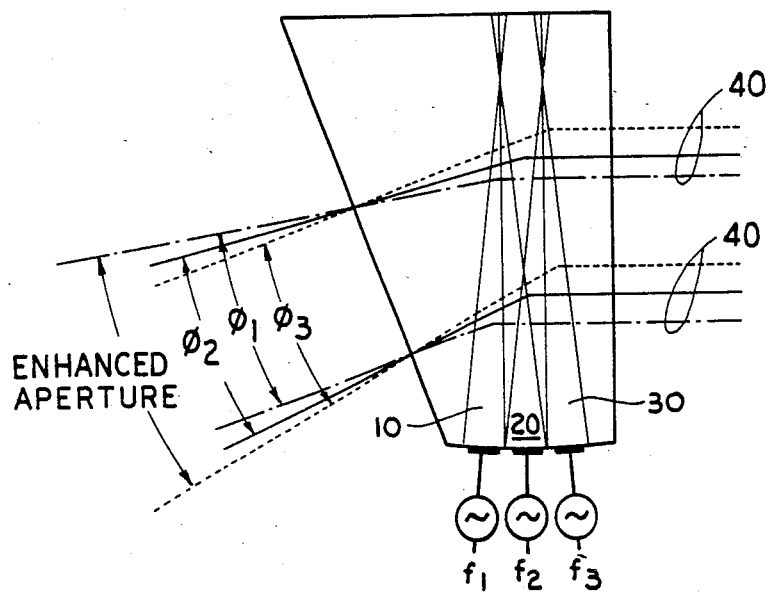
FIG. 3 schematically illustrate an AODLF according to the present invention.
Figure 2:
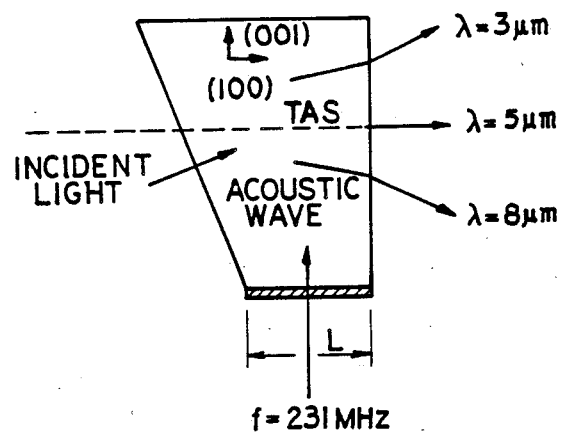
FIG. 2 schematically illustrates a TAS AODLF.

Referring to FIG. 3, an AODLF in accordance with the present invention includes acoustic means for launching a plurality of acoustic waves of differing frequencies $f_1$, $f_2$ and $f_3$ into a crystal at respective angles to each other. The frequencies $f_1$, $f_2$ and $f_3$ are chosen so that light incident to an input face at a predetermined angle such as $\phi_1$, $\phi_2$ and $\phi_3$ and having a given wavelength, is diffracted from the AODLF in a parallel beam 40. Thus, if an input beam is moved throughout a predetermined angle corresponding to the enhanced angular aperture shown in FIG. 3, the input beam will first phase match with one of the acoustic columns (10, 20, or 30), then with a second one of the acoustic columns (10, 20, or 30) and then with a third one of the acoustic columns (10, 20, or 30) so that the beams all exit parallel.

The same effect can be achieved by using three identical AODLFs operating at three different frequencies and being tilted with respect to each other. In such a case, light incident to input faces of the three AODLFs will phase match with a first one of the AODLFs. As the incident light is rotated through a small angle, it no longer phase matches with the first AODLF, and instead phase matches with a second AODLFs. Since the second AODLF is tilted with respect to the first AODLF, the light diffracted by the second AODLF will exit parallel to light diffracted by the first AODLFs This process can be repeated for third and subsequent AODLF.

If the angles between the respective acoustical columns (10, 20, or 30) are chosen properly (as discussed below), the wavelength resolution of the enhanced angular aperture AODLF will not be significantly different from the resolution for a single channel AODLF. For example, in a single channel AODLF the frequency f is chosen so that light incident to the AODLF (at an angle relative to the optic axis), is diffracted and leaves the AODLF normal to the acoustic beam direction. From equation 4 a TAS AODLF operating with 10 micrometer wavelength incident light and a 110 MHz RF drive, has an angular aperture of approximately 0.2°. Thus, light rays incident 0.1° on either side of the exact Bragg angle will diffract into the output beam 40, but with only one half of the intensity of light incident at the exact Bragg angle. Light rays incident at an angle greater than 0.1° beyond the exact Bragg angle, will not meet the exact phase matching requirements and will therefore pass through the AODLF mostly undiffracted. If a second single channel AODLF is tilted by an angle of 0.2° with respect to the first AODLF, then this second channel AODLF will efficiently diffract light which is incident at 0.2° greater than the exact Bragg angle for the first channel. The second channel will not, however, add to the diffraction of light rays which were phase matched for the first channel. If the second AODLF has the same frequency RF applied to it as the first channel (e.g., 110 MHz), then the beams diffracted by the first channel and by the second channel will be angularly separated by 0.2°, and the device (combination of the first and second AODLFs) would suffer serious loss of resolution. Thus, the RF applied to the second channel must be adjusted so that light diffracted by the second AODLF will be superimposed (i.e., parallel to) light diffracted by the first channel AODLF. The result is an AODLF with an acceptance increased by a factor of two. The second AODLF channel does not produce any additional effects on the light diffracted by the first channel, because the polarization of the light is rotated by 90°, and cannot interact with the second AODLF. The above can be applied to third and subsequent AODLFs for as many channels as needed.

Quantitatively, adding tilted acoustic channels in the manner described above to an AODLF does not seriously degrade the resolution of the resulting AODLF. Differentiating equations 1 and 2 with respect to the acoustic frequency yields the following.

$$\frac{d\theta_i}{df} = \frac{\lambda}{2n_i v \cos\theta_1} - \frac{v}{2\cos\theta_1 \lambda f^2} \frac{(n_i^2 - n_d^2)}{n_i} \quad (5)$$

$$\frac{d\theta_d}{df} = \frac{\lambda}{2n_d v} + \frac{v}{2\lambda f^2} \frac{(n_i^2 - n_d^2)}{n_i} \quad (6)$$

As seen from these equations, the frequency dependence of the incident angle on frequency is always less than that of the diffracted angle. This is contrary to isotropic (i.e., same polarization for input and output light) gratings. In isotropic gratings, the incident and diffracted light angles vary in exactly the same manner as the grating constant is changed. Thus, with isotropic materials, resolution is be degraded by exactly the same factor as the angular aperture would be increased. In the present invention, it is the birefringent character of the acoustic grating that allows the angular aperture to be increased without degrading the resolution.

The following illustrates the effectiveness of the present invention in a TAS AODLF operating with 10 micrometer incident light, an acoustic frequency of 110 MHz and a $\theta_i$ determined using Equation 1. Using these values in equations 5 and 6 results in an AODLF With a frequency dependence of the input light with respect to incident angle of:

$$\frac{d\theta_i}{df} = -0.0142 \text{ degrees/MHz}, \quad (7)$$

and a frequency dependence of the diffracted light of:

$$\frac{d\theta_d}{df} = 0.0182 \text{ degrees/MHz}, \quad (8)$$

As seen from equations 7 and 8 the incident angle is approximately 13 times less sensitive to variations in the acoustic frequency than is the diffracted light angle. This result corresponds to approximately an 8% loss in resolution. Thus, for an AODLF with a tilt angle of 0.2°, the offset frequency for each channel should be (0.2/0.182) MHz or 1.1 MHz.

As seen from the above, the present invention provides a method and apparatus for increasing the angular aperture of an acousto-optic dispersive light filter by providing acoustic frequencies offset with respect to each other in terms of frequency and angular relationship so as to optimize the phase matching of a portion of the input acceptance angle for each frequency. The combined acceptance angle for each frequency results in an enlarged angular aperture for the entire AODLF device. While the present invention has been described with respect to specific examples, these examples are not intended to limit the present invention, which instead is defined by the following claims.

We claim:

1. A method of increasing the angular aperture of an acousto-dispersive light filter comprising an optically birefringement crystal having an optical input face with an optic axis and an optical output face, said method comprising the steps of:
    (a) applying light to the optical input face at an angle of incidence within an angular aperture, the angle of incidence being within a predetermined angular distance from the optic axis; and
    (b) launching a plurality of acoustic waves of differing frequencies into the crystal at respective angles to each other so that the light exits the optical output face at a given angle with respect to the optical output face regardless of said angle of incidence.

2. A method according to claim 1, wherein step (a) comprises applying light within a predetermined angular distance from the exact Bragg angle.

3. An acousto-optic dispersive light filter comprising:
    an optically birefringement crystal having an optic input face with an optic axis, and acoustic input face and an output face;
    acoustic means, operatively connected to the acoustic input face, for launching a plurality of acoustic waves of differing frequencies into said crystal at respective angles to each other, so that light beams incident to the optical input face at respective angles of incidence within an angular aperture determined with respect to the optic axis, are diffracted in accordance with a corresponding one of the acoustic frequencies so as to exit the output face at a given angle with respect to the output face regardless of the respective angles of incidence.

* * * * *